US012669189B2

(12) United States Patent
Head et al.

(10) Patent No.: US 12,669,189 B2
(45) Date of Patent: Jun. 30, 2026

(54) PRESSURE RELIEF VALVE (PRV) ASSEMBLY INCLUDING END-TO-END COUPLED PRV STAGES AND RELATED METHODS

(71) Applicant: PREVCO Subsea LLC, Fountain Hills, AZ (US)

(72) Inventors: John Head, Fountain Hills, AZ (US); James French, Chandler, AZ (US)

(73) Assignee: PREVCO Subsea LLC, Fountain Hills, AZ (US)

( * ) Notice: Subject to any disclaimer, the term of this patent is extended or adjusted under 35 U.S.C. 154(b) by 3 days.

(21) Appl. No.: 19/034,267

(22) Filed: Jan. 22, 2025

(65) Prior Publication Data

US 2025/0237314 A1     Jul. 24, 2025

Related U.S. Application Data

(60) Provisional application No. 63/624,276, filed on Jan. 23, 2024.

(51) Int. Cl.
    *F16K 17/04*        (2006.01)
    *F16K 17/06*        (2006.01)
(52) U.S. Cl.
    CPC ............ *F16K 17/044* (2013.01); *F16K 17/06* (2013.01)
(58) Field of Classification Search
    CPC ............................... F16K 17/044; F16K 17/06
    USPC ....... 137/506, 814, 315.33, 329.4, 471, 512, 137/512.2, 513, 515, 516.27, 528, 540, 137/543.23, 613, 614.2
    See application file for complete search history.

(56) References Cited

U.S. PATENT DOCUMENTS

| | | | | |
|---|---|---|---|---|
| 1,022,556 A | * | 4/1912 | Johnson et al. ...... | F04B 53/109 |
| | | | | 137/880 |
| 3,916,946 A | * | 11/1975 | Motzer ................. | F16K 17/044 |
| | | | | 137/538 |
| 4,232,704 A | * | 11/1980 | Becker ................... | E03C 1/106 |
| | | | | 137/512 |
| 4,284,097 A | * | 8/1981 | Becker ................. | F16K 15/066 |
| | | | | 137/454.2 |
| 5,918,628 A | * | 7/1999 | Harding ............... | F16K 15/026 |
| | | | | 137/538 |
| 5,971,016 A | * | 10/1999 | Wass ................... | F16K 17/0413 |
| | | | | 137/542 |

(Continued)

FOREIGN PATENT DOCUMENTS

| | | | | | |
|---|---|---|---|---|---|
| GB | | 876990 A | * | 9/1961 | ........... F16K 17/044 |

*Primary Examiner* — Minh Q Le
(74) *Attorney, Agent, or Firm* — Allen, Dyer, Doppelt + Gilchrist, P.A. Attorneys at Law

(57) ABSTRACT

A pressure relief valve (PRV) assembly may include PRV stages coupled in end-to-end relation. Each PRV stage may include a PRV body having a cavity therein to receive an adjacent PRV body therein and a fluid passageway fluidly coupled to the cavity. Each PRV stage may also include a PRV valve carried within the cavity and extending within the fluid passageway, and a first biasing member carried within the cavity to bias the PRV valve. Each PRV stage may further include a biasing member stop coupled to the PRV valve within the fluid passageway, and a second biasing member held within the fluid passageway by the biasing member stop and biasing the PRV valve. An end cap may be coupled to a last PRV stage of the PRV stages to hold the first biasing member within the cavity.

26 Claims, 4 Drawing Sheets

(56)                References Cited

U.S. PATENT DOCUMENTS

| | | | |
|---|---|---|---|
| 6,581,626 B2 * | 6/2003 | Noll ..................... | F16K 15/066 |
| | | | 137/454.2 |
| 6,929,023 B2 * | 8/2005 | Whitaker ................. | E03F 7/04 |
| | | | 137/454.2 |
| 7,434,593 B2 * | 10/2008 | Noll ..................... | F16K 15/066 |
| | | | 137/454.2 |
| 8,230,875 B2 * | 7/2012 | Norman ............... | F16K 15/063 |
| | | | 137/542 |
| 11,473,685 B2 | 10/2022 | Christensen et al. | |
| 11,703,139 B2 | 7/2023 | Christensen et al. | |
| 12,085,181 B2 | 9/2024 | Christensen et al. | |
| 2004/0244840 A1 * | 12/2004 | Takeda ................. | F16K 15/063 |
| | | | 137/512 |
| 2006/0076062 A1 * | 4/2006 | Andersson ........... | F16K 15/063 |
| | | | 137/512 |
| 2009/0107564 A1 * | 4/2009 | Nitta ..................... | F16K 17/06 |
| | | | 137/543.17 |
| 2014/0347867 A1 * | 11/2014 | Chapman ............... | F16K 17/04 |
| | | | 137/542 |
| 2014/0360590 A1 * | 12/2014 | Bertoldi ............... | F16K 17/048 |
| | | | 137/15.18 |
| 2024/0384806 A1 | 11/2024 | Head et al. | |

* cited by examiner

PRESSURE RELIEF VALVE (PRV) ASSEMBLY INCLUDING END-TO-END COUPLED PRV STAGES AND RELATED METHODS

RELATED APPLICATION

The present application claims the priority benefit of provisional application Ser. No. 63/624,276 filed on Jan. 23, 2024, the entire contents of which are herein incorporated by reference.

TECHNICAL FIELD

The present invention relates to the field of valves, and, more particularly, to pressure relief valves and related methods.

BACKGROUND

A pressure differential may be formed between an internal pressure inside of an enclosure and an external pressure outside of the enclosure. For example, a subsea enclosure or housing may be considered a hydrostatic pressure vessel that, while generally able to withstand external pressure, generally cannot withstand internal pressure without a performance degradation, for example, failure.

A relatively high internal pressure within a subsea housing, for example, may occur as the result of hydraulic leaks and/or battery off-gassing. A relatively high internal pressure may also occur from a slow sea water leak whereby the internal pressure may not be relieved quickly enough, for example, during recovery to the surface.

Accordingly, it may be desirable for the internal pressure to be relatively close to the external pressure, for example, for increased safety. To address the pressure differential between the inside of an enclosure and external to the enclosure, a pressure relief valve (PRV) may be used. A PRV may be particularly advantageous for reducing the internal pressure of the enclosure, for example, in the case of an internal pressure rise or spike. In a subsea environment, a PRV with a relatively low cracking pressure may be used to limit the buildup of inside pressure within a subsea electronics housing.

SUMMARY

A pressure relief valve (PRV) assembly may include a plurality of PRV stages coupled in end-to-end relation. Each PRV stage may include a PRV body having a cavity therein to receive an adjacent PRV body therein and a fluid passageway fluidly coupled to the cavity, and a PRV valve carried within the cavity and extending within the fluid passageway. Each PRV stage may also include a first biasing member carried within the cavity to bias the PRV valve and a biasing member stop coupled to the PRV valve within the fluid passageway. Each PRV stage may also include a second biasing member held within the fluid passageway by the biasing member stop and biasing the PRV valve. The PRV assembly may also include an end cap coupled to a last PRV stage of the plurality of PRV stages to hold the first biasing member within the cavity.

The PRV valve may include a head configured to define a seal between the cavity and the fluid passageway, and a shaft extending outwardly from the head within the fluid passageway. The biasing member stop may be threadably coupled to the shaft, for example. The PRV valve may include a sealing member carried by the head adjacent the fluid passageway, for example.

The PRV body may have an enlarged size body section having the cavity therein and a reduced size body section to be coupled within a cavity of an adjacent PRV body. The PRV body may include a sealing member carried by a face of the enlarged size body section adjacent the reduced size body section to define a seal with an adjacent PRV body, for example.

The fluid passageway may have first and second shoulders therein. The second biasing member may rest on the first shoulder, and a first biasing member of an adjacent PRV member may rest on the second shoulder, for example.

The end cap may have an end-cap passageway therein in fluid communication with the cavity. The end cap may have a shoulder within the end-cap passageway, and the first biasing member may rest on the shoulder, for example. The first biasing member may include a first coil spring, and the second biasing member may include a second coil spring. A diameter of the fluid passageway may be smaller than a diameter of the cavity, for example.

A method aspect is directed to a method of making a pressure relief valve (PRV) assembly. The method may include coupling a plurality of PRV stages in end-to-end relation. Each PRV stage may include a PRV body having a cavity therein to receive an adjacent PRV body therein and a fluid passageway fluidly coupled to the cavity and a PRV valve carried within the cavity and extending within the fluid passageway. Each PRV stage may also include a first biasing member carried within the cavity to bias the PRV valve and a biasing member stop coupled to the PRV valve within the fluid passageway. Each PRV stage may also include a second biasing member held within the fluid passageway by the biasing member stop and biasing the PRV valve. The method may further include coupling an end cap to a last PRV stage of the plurality of PRV stages to hold the first biasing member within the cavity.

The PRV valve may include a head configured to define a seal between the cavity and the fluid passageway, and a shaft extending outwardly from the head within the fluid passageway. The biasing member stop may be threadably coupled to the shaft, for example. The PRV valve may include a sealing member carried by the head adjacent the fluid passageway, for example.

The PRV body may have an enlarged size body section having the cavity therein and a reduced size body section. Coupling the plurality of PRV stages may include coupling the reduced size body within a cavity of an adjacent PRV body, for example.

Another method aspect is directed to a method of making a pressure relief valve (PRV) assembly. The method may include forming each of a plurality of PRV stages by at least forming a PRV body having a cavity therein to receive an adjacent PRV body therein and a fluid passageway fluidly coupled to the cavity and positioning a PRV valve carried within the cavity and extending within the fluid passageway. The method may also include forming each of the plurality of PRV stage by at least positioning a first biasing member carried within the cavity to bias the PRV valve, coupling a biasing member stop to the PRV valve within the fluid passageway, and positioning a second biasing member within the fluid passageway and to be held by the biasing member stop to bias the PRV valve. The method may further include coupling the plurality of PRV stages in end-to-end relation and coupling an end cap to a last PRV stage of the plurality of PRV stages to hold the first biasing member within the cavity.

The PRV valve may include a head configured to define a seal between the cavity and the fluid passageway, and a shaft extending outwardly from the head within the fluid passageway. Coupling the biasing member stop may include threadably coupling the biasing member stop to the shaft, for example.

The PRV body may have an enlarged size body section having the cavity therein and a reduced size body section. Coupling the plurality of PRV stages may include coupling the reduced size body within a cavity of an adjacent PRV body, for example.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
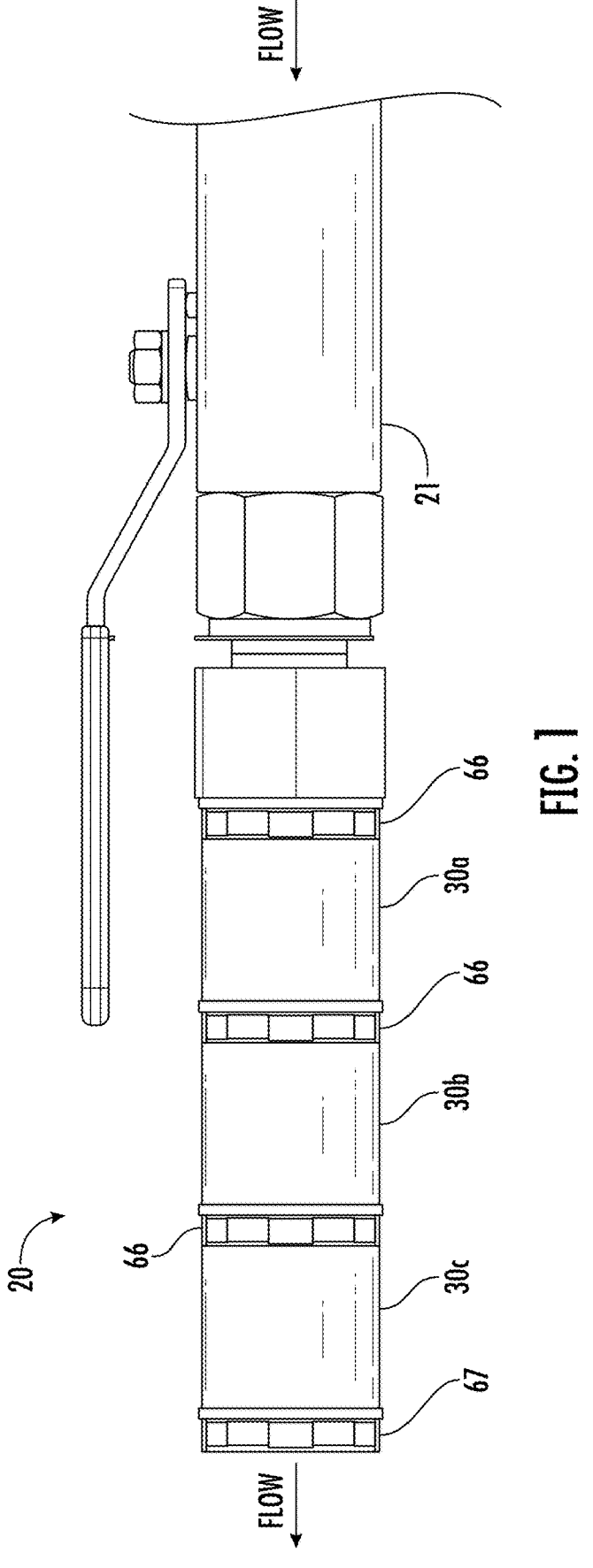
FIG. 1 is a schematic diagram of a pressure relief valve (PRV) assembly according to an embodiment.

Referring initially to FIG. 1, a pressure relief valve (PRV) assembly 20 includes PRV stages 30a-30c coupled in series or end-to-end relation. The PRV assembly 20 may couple to an outlet of a housing 21, for example, an underwater housing. Each PRV stage 30a-30c may conceptually be considered a PRV sub-assembly, for example. While three PRV stages 30a-30c are illustrated, those skilled in the art will appreciate that there may be any number of PRV stages, and that the number of stages may be dependent on the overall desired operating pressure of the PRV assembly 20, as will be described in further detail below.

Figure 2:
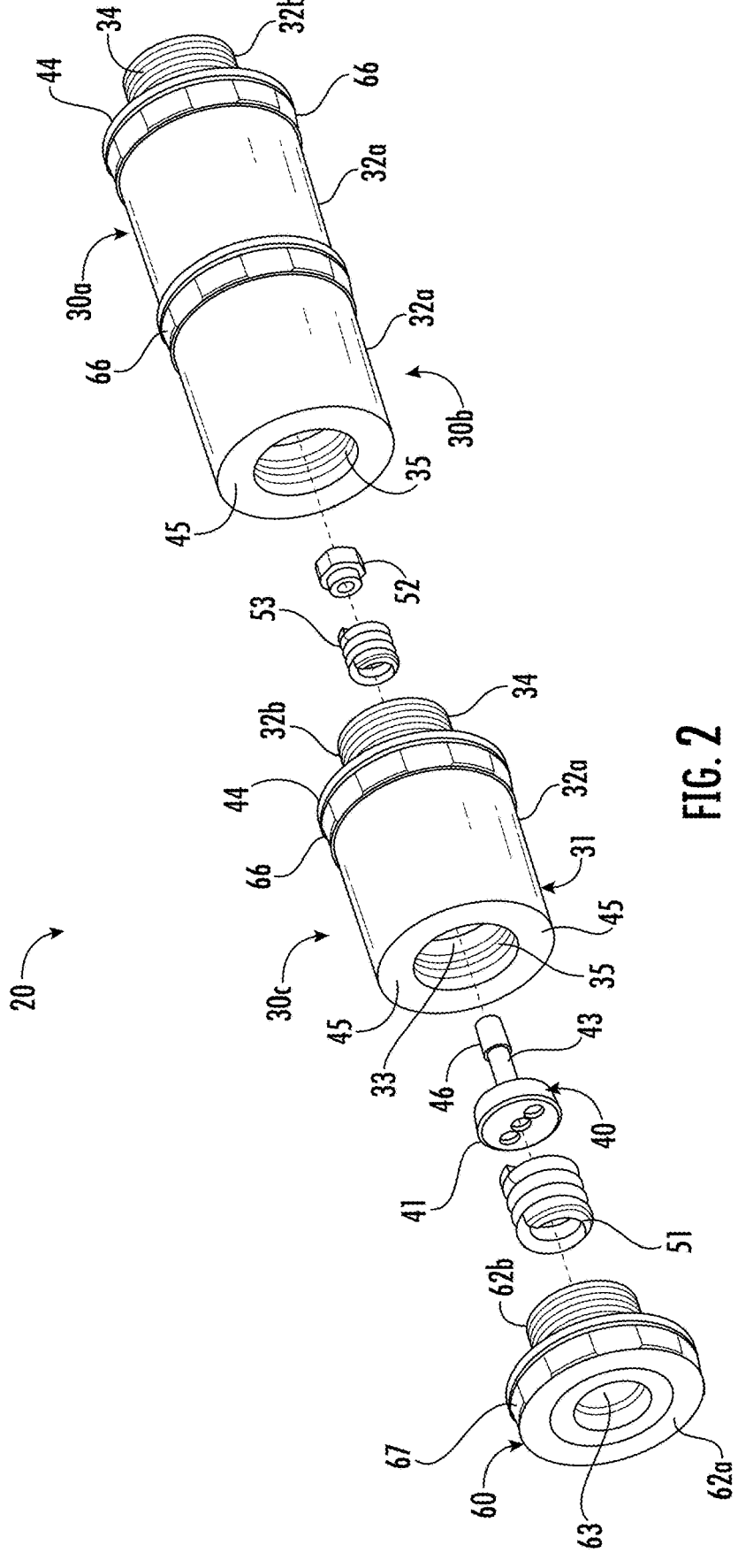
FIG. 2 is a partially exploded perspective view of the PRV assembly of FIG. 1.
Figure 3:
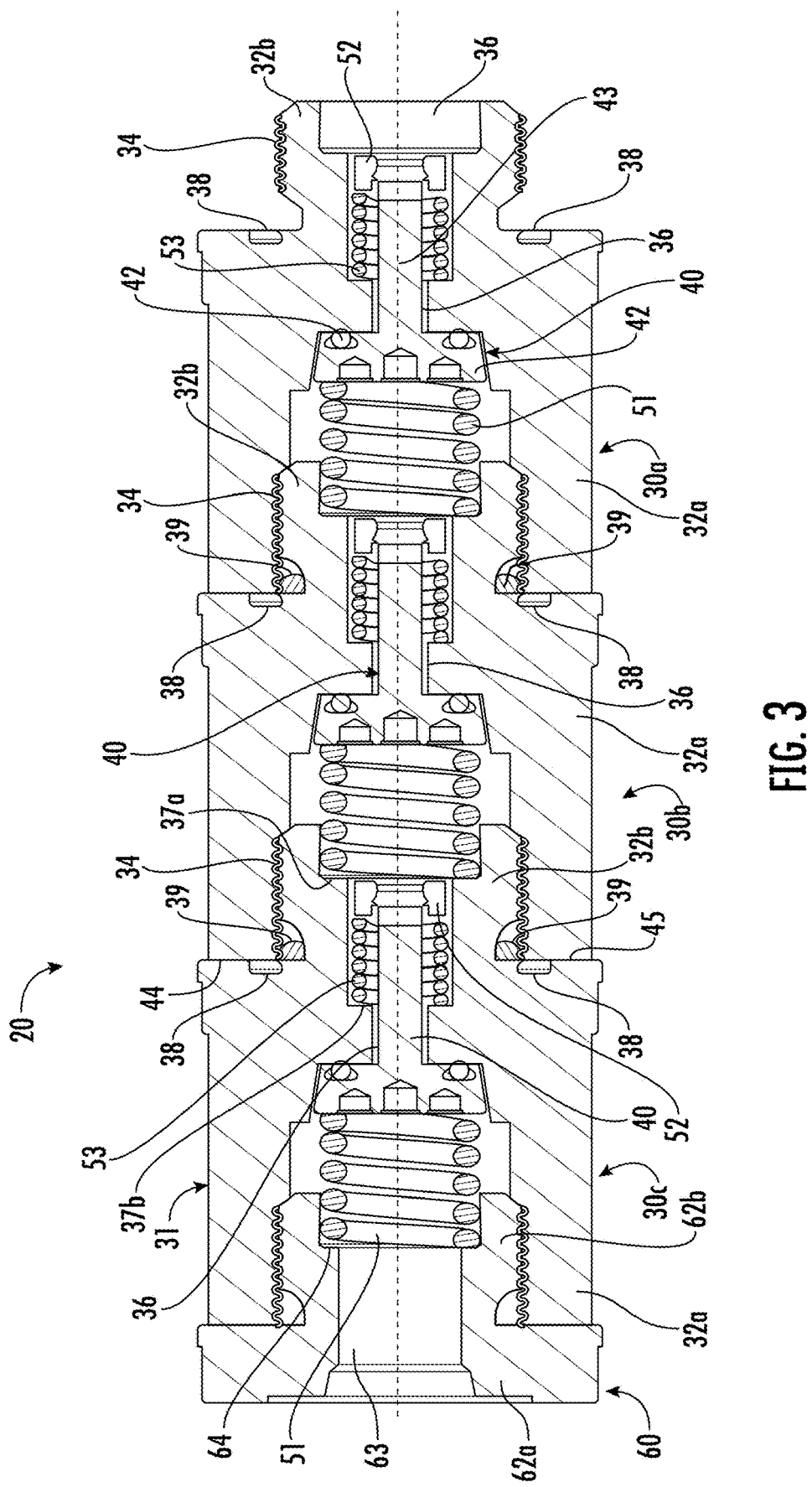
FIG. 3 is a schematic cross-sectional view of the PRV assembly of FIG. 1.
Figure 4:
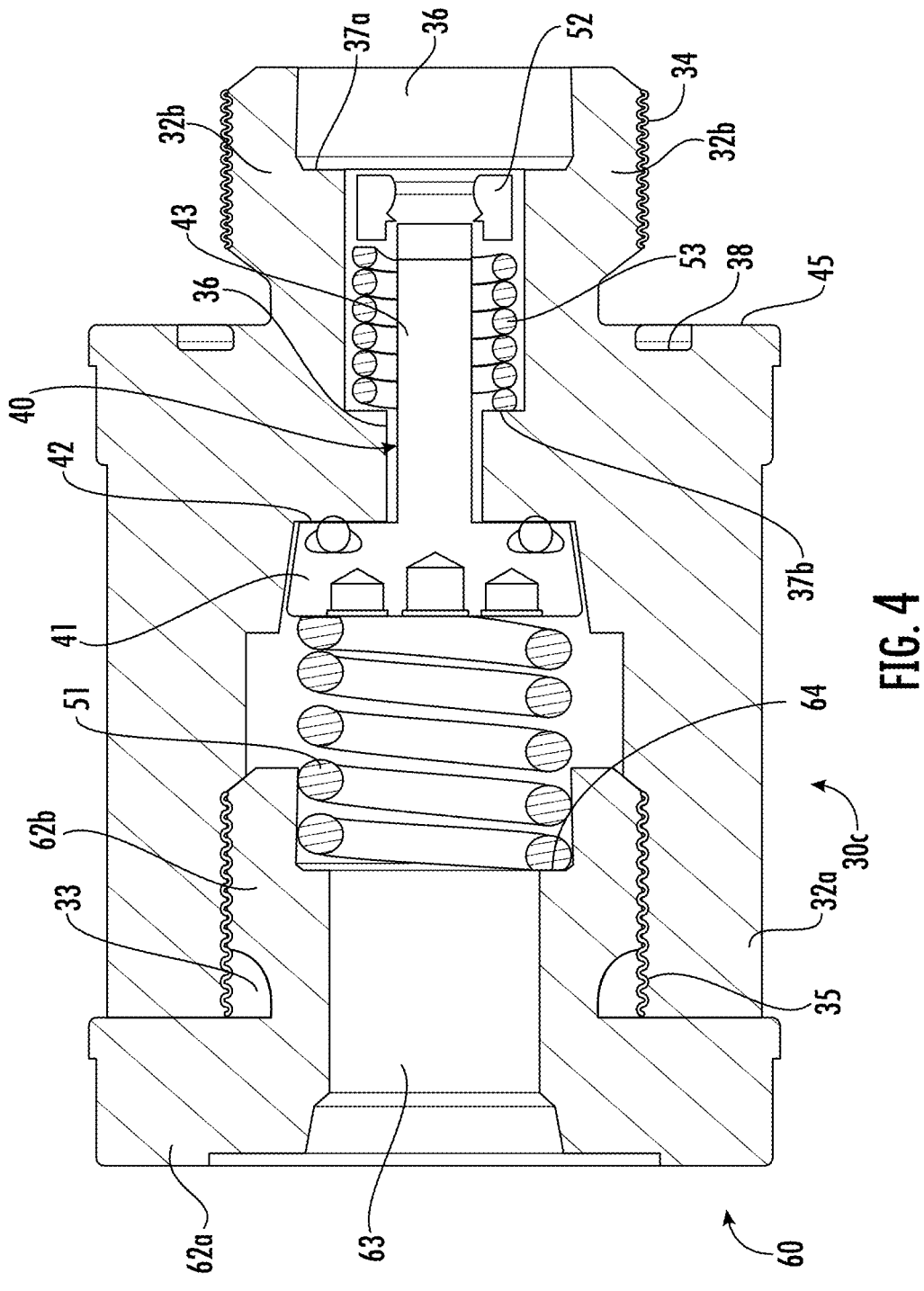
FIG. 4 is a schematic cross-sectional view of a single PRV stage and end cap of the PRV assembly of FIG. 3.

Referring now additionally to FIGS. 2-4, each PRV stage 30a-30c illustratively includes a PRV body 31. Each PRV body 31 is illustratively cylindrical and has an enlarged size body section 32a that has a cavity 33 therein. The cavity 33, which is defined by an opening in the PRV body (the enlarged size body section 32a), is sized to receive an adjacent PRV body therein. In other words, the cavity 33 is an open cavity. The cavity 33 opens to the downstream side of the given PRV stage 30a-30c.

Each PRV body 31 also has a reduced size body section 32b upstream from the enlarged size body section 32a. The reduced size body section 32b is sized to be smaller than the enlarged size body section 32a, for example, having a smaller diameter. The reduced size body section 32b, which may conceptually be considered a plug, is sized to fit within the cavity 33 of an adjacent PRV body 31. The reduced size body section 32b may include threads 34 along an outer circumference for threadably engaging an interior wall of the enlarged size body segment 32a, which defines the cavity 33. In other words, the interior wall defining the cavity 33 may also include threads 35.

Adjacent PRV stages 30a-30b, 30b-30c are coupled by threadably engaging the reduced size body section 32b of one PRV stage and the threaded interior wall of the cavity 33 of the adjacent PRV stage. The reduced size body section 32b of one PRV stage 30a-30c and the threaded interior wall of the cavity 33 of the adjacent PRV stage may be engaged until a desirable seal is formed between the adjacent PRV stages, for example, upon mating of the upstream surface 44 or face of the enlarged size body section 32a with a downstream surface 45 of the adjacent enlarged size body section. To facilitate a desirable seal, a first sealing member or first seal 38 may be carried by the upstream surface 44 or face of the enlarged size body section 32a (e.g., adjacent the reduced size body section 32b) for sealing with the downstream surface 45 of the adjacent PRV stage. The first seal 38 may be rubber or other elastomeric material, for example. Of course, the first seal 38 may be other and/or additional materials. A second sealing member or second seal 39 is around the reduced size body section 32b adjacent the downstream surface 45 and the first seal 38. More particularly, the second seal 39 is carried around a neck of the reduced size body section 32b in a recess. The second seal 39 may be rubber or other elastomeric material, for example. Of course, the second seal 39 may be other and/or additional materials. While each PRV body 31 is described in terms of the enlarged and reduced size body sections 32a, 32b, each PRV body may be formed as a monolithic unit.

Each PRV stage 30a-30n also includes a fluid passageway 36 fluidly coupled to the cavity 33. The fluid passageway 36 is illustratively stepped so that the size or diameter increases in size from the downstream side to the upstream side. Each increase in size or inner circumference of the reduced size body section 32b is defined by a shoulder 37a, 37b or step.

A PRV valve 40, or poppet, is carried within the cavity 33 and extends within the fluid passageway 36. More particularly, the PRV valve 40 includes a valve head 41 that rests or is biased within the cavity 33 to block fluid passage between the fluid passageway 36 and the cavity 33. A seal 42 is carried by the valve head 41 adjacent the fluid passageway 36 and forms a seal with the adjacent portions of the interior of the enlarged size body section 32a within the cavity 33 (i.e., the bottom of the cavity). The seal 42 may be rubber, for example. The seal 42 may be another type of material, for example, a type of elastomeric material.

A valve shaft 43 extends outwardly, upstream, from the valve head 41 within the fluid passageway 36. More particularly, a proximal end of the valve shaft 43 is coupled to the valve head. A biasing member stop 52 is coupled to a distal end of the valve shaft 43 and within the fluid passageway 36. The biasing member stop 52 may be threadably coupled to the distal end of the valve shaft 43, for example, by way of threads 46 along a distal end of the valve shaft. For example, the biasing member stop 52 may be considered an adjustable nut, for example. Further details of the biasing member stop 52 will be explained below.

A first biasing member 51 is carried within the cavity 33 to bias the PRV valve 40. More particularly, the first biasing member 51 biases the PRV valve 40 in a closed position so that fluid cannot pass from the fluid passageway 36 into the cavity 33. The first biasing member 51 is illustratively in the form of a coil spring. Of course, the first biasing member 51 may be another type of biasing member, for example, a flat spring. The first biasing member 51 may provide a constant spring force, as will be appreciated by those skilled in the art.

A second biasing member 53 is carried within the fluid passageway 36. More particularly, the second biasing member 53, which is illustratively in the form of a coil spring, surrounds the valve shaft 43 within the fluid passageway 36, and rests upon the second shoulder 37b (from upstream to downstream) or step within the fluid passageway. The second biasing member 53 may be a different type of biasing member, for example, a flat spring. The second biasing member 53 is held into place around the valve shaft 43 by the biasing member stop 52. More particularly, the second biasing member 53 may be placed under compression, the amount of which may be based upon adjustment of the biasing member stop 52, or adjustable nut, for example, whether the biasing member stop is threaded on the valve shaft 43 to be closer or farther away from the second shoulder 37b. The closer the biasing member stop 52 is to the second shoulder 37b, the more compression that is placed upon the second biasing member 53. Thus, the second biasing member 53 may provide a force that is adjustable based upon setting of the biasing member stop 52 along the valve shaft 43. In other words, the biasing member stop 52 permits setting of an adjustable pressure.

The second biasing member 53, similarly to the first biasing member 51, also biases the PRV valve 40 in a closed position, the force of which provided by the second biasing member may be adjustable, as described above. This contrasts with the first biasing member 51, which may provide a constant spring force since the amount of compression provided to it generally cannot be changed (i.e., there is no biasing member stop 52 or nut that is adjustable). In some embodiments, a threaded washer or member may be coupled to an interior surface of the fluid passageway 36 adjacent the first shoulder 37a such that it may be variably spaced from the first shoulder, and thus spacing the first biasing member 51 from the first shoulder, and compressing the first biasing member. By changing the spacing between the first shoulder 37a and the washer or end of the first biasing member 51, the setting pressure of the first biasing member may be changed or adjusted.

An end cap 60 is coupled to a last PRV stage 30c from among the PRV stages 30a-30c. The end cap 60 may conceptually be considered a top nut and holds the first biasing member 51 in place within the cavity 33 of the adjacent PRV stage 33c. The end cap 60 has an end cap body. Similarly to the PRV body 31, the end cap 60 has enlarged size and reduced size end cap sections 62a, 62b and threadably engages the adjacent PRV stage 30c. The end cap 60 is illustratively cylindrical in shape and is sized to match each PRV stage 30a-30c. More particularly, the enlarged end cap section 62a couples to the downstream surface 45 of the enlarged size body section 32a of the adjacent or last PRV stage 30c, for example, upon tightening or threading of the reduced size end cap section 62b within the cavity 33.

The end cap 60 has an end-cap passageway 63, or through-opening, therethrough to provide fluid communication from the last adjacent PRV stage 30c to an exterior environment, for example, an undersea environment. The through-opening 63 is stepped so such that the through-opening becomes enlarged from downstream to upstream. The enlargement of the through-opening 63 defines a shoulder 64. The shoulder 64 is sized to and holds the first biasing member 51 of the adjacent PRV stage 30c in place within the cavity. More particularly, the shoulder 64 provides compression or biasing of the first biasing member 51 to bias the PRV valve 40 in the closed position (i.e., covering the fluid passageway 36).

During operation, a first PRV stage 30a is coupled to a housing 21, for example, an undersea housing. It may be desirable to set the PRV assembly 20 so that the internal pressure within the undersea housing 21 does not exceed a desired pressure threshold. For example, it may be desirable to not exceed 450 bars. However, each PRV stage 30a-30c may be rated for 100-200 bars, depending on how the PRV stages are configured, for example, by way of the biasing member stops 52 to provide the adjustable setting pressure of the second biasing members 53. Accordingly, a first PRV stage 30a may be set for 200 bars, a second PRV stage 30b for 150 bars, and a third PRV stage 30c at 100 bars. In another example, assume that each PRV stage 30a-30c is set to relieve the same pressure—each stage being responsible for ⅓ of the total pressure relief. In this example, the total pressure from the undersea housing 21 is presented at the PRV valve 40 of the first PRV stage 30a. This PRV stage 30a reduces the pressure by ⅓ so that the ⅔ the total pressure (i.e., pressure that exited the undersea housing 21 or was presented to the PRV valve of the first PRV stage) is reduced by ⅓. The second PRV stage 30b would have the same effect by reducing the pressure from the first PRV stage 30a by another ⅓ or reducing the total pressure by ⅔. The third or last PRV stage 30c has the same effect so that zero (0) pressure (e.g., differential pressure) is present at or through the end cap 60.

Illustratively, for ease of installation, each PRV body 31 may include an exterior surface feature 66 (e.g., facets), for example, for engaging with or mating with an installation tool or wrench. A similar exterior surface feature 67 may be included along an exterior, e.g., exterior circumference, of the end cap 60, and more particularly, the enlarged size end cap section 62a. Further details of a PRV assembly, and more particularly, a dual PRV valve PRV assembly and its operation are described in U.S. Patent Application Publication No. 2023/0296185, the entire contents of which are hereby incorporated by reference.

A method aspect is directed to a method of making a pressure relief valve (PRV) assembly 20. The method may include coupling a plurality of PRV stages 30a-30c in end-to-end relation. Each PRV stage 30a-30c may include a PRV body 31 having a cavity 33 therein to receive an adjacent PRV body therein and a fluid passageway 36 fluidly coupled to the cavity and a PRV valve 40 carried within the cavity and extending within the fluid passageway. Each PRV stage 30a-30c may also include a first biasing member 51 carried within the cavity 33 to bias the PRV valve 40 and a biasing member stop 52 coupled to the PRV valve within the fluid passageway 36. Each PRV stage 30a-30c may also include a second biasing member 53 held within the fluid passageway 36 by the biasing member stop 52 and biasing the PRV valve 40. The method may further include coupling an end cap 60 to a last PRV stage 30c of the plurality of PRV stages 30a-30c to hold the first biasing member 51 within the cavity 33.

The PRV valve 40 may include a head 41 configured to define a seal 42 between the cavity 33 and the fluid passageway 36, and a shaft 43 extending outwardly from the head within the fluid passageway. The biasing member stop 52 may be threadably coupled to the shaft, for example. The PRV valve 40 may include a sealing member 38 carried by the head 41 adjacent the fluid passageway 36, for example.

The PRV body 31 may have an enlarged size body section 32a having the cavity 33 therein and a reduced size body section 32b. Coupling the plurality of PRV stages 30a-30c may include coupling the reduced size body 32b within a cavity of an adjacent PRV body, for example.

Another method aspect is directed to a method of making a pressure relief valve (PRV) assembly 20. The method may include forming each of a plurality of PRV stages 30a-30c by at least forming a PRV body 31 having a cavity 33 therein to receive an adjacent PRV body therein and a fluid passageway 36 fluidly coupled to the cavity and positioning a PRV valve 40 carried within the cavity and extending within the fluid passageway. The method may also include forming each of the plurality of PRV stages 30*a*-30*c* by at least positioning a first biasing member 51 carried within the cavity 33 to bias the PRV valve 40, coupling a biasing member stop 52 to the PRV valve 40 within the fluid passageway 36, and positioning a second biasing member 53 within the fluid passageway and to be held by the biasing member stop to bias the PRV valve. The method may further include coupling the plurality of PRV stages 30*a*-30*c* in end-to-end relation and coupling an end cap 60 to a last PRV stage 30*c* of the plurality of PRV stages to hold the first biasing member 51 within the cavity 33.

The PRV valve 40 may include a head 41 configured to define a seal 42 between the cavity 33 and the fluid passageway 36, and a shaft 43 extending outwardly from the head within the fluid passageway. Coupling the biasing member stop 52 may include threadably coupling the biasing member stop to the shaft 43, for example.

The PRV body 31 may have an enlarged size body section 32*a* having the cavity 33 therein and a reduced size body section 32*b*. Coupling the plurality of PRV stages 30*a*-30*c* may include coupling the reduced size body 32*b* within a cavity of an adjacent PRV body, for example.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A pressure relief valve (PRV) assembly comprising:
a plurality of PRV stages coupled in end-to-end relation, each PRV stage comprising
  a PRV body having a cavity therein to receive an adjacent PRV body therein and a fluid passageway fluidly coupled to the cavity,
  a PRV valve carried within the cavity and extending within the fluid passageway,
  a first biasing member carried within the cavity to bias the PRV valve,
  a biasing member stop coupled to the PRV valve within the fluid passageway, and
  a second biasing member held within the fluid passageway by the biasing member stop and biasing the PRV valve; and
an end cap coupled to a last PRV stage of the plurality of PRV stages to hold the first biasing member within the cavity.

2. The PRV assembly of claim 1 wherein the PRV valve comprises a head configured to define a seal between the cavity and the fluid passageway, and a shaft extending outwardly from the head within the fluid passageway.

3. The PRV assembly of claim 2 wherein the biasing member stop is threadably coupled to the shaft.

4. The PRV assembly of claim 2 wherein the PRV valve comprises a sealing member carried by the head adjacent the fluid passageway.

5. The PRV assembly of claim 1 wherein the PRV body has an enlarged size body section having the cavity therein and a reduced size body section to be coupled within a cavity of an adjacent PRV body.

6. The PRV assembly of claim 5 wherein the PRV body comprises a sealing member carried by a face of the enlarged size body section adjacent the reduced size body section to define a seal with an adjacent PRV body.

7. The PRV assembly of claim 1 wherein the fluid passageway has first and second shoulders therein; wherein the second biasing member rests on the first shoulder; and wherein a first biasing member of an adjacent PRV stage rests on the second shoulder.

8. The PRV assembly of claim 1 wherein the end cap has an end-cap passageway therein in fluid communication with the cavity.

9. The PRV assembly of claim 8 wherein the end cap has a shoulder within the end-cap passageway; and wherein the first biasing member rests on the shoulder.

10. The PRV assembly of claim 1 wherein the first biasing member comprises a first coil spring.

11. The PRV assembly of claim 1 wherein the second biasing member comprises a second coil spring.

12. The PRV assembly of claim 1 wherein a diameter of the fluid passageway is smaller than a diameter of the cavity.

13. A pressure relief valve (PRV) assembly comprising:
a plurality of PRV stages coupled in end-to-end relation, each PRV stage comprising
  a PRV body having a cavity therein to receive an adjacent PRV body therein and a fluid passageway fluidly coupled to the cavity, the PRV body having an enlarged size body section having the cavity therein, and a reduced size body section to be coupled within a cavity of an adjacent PRV body,
  a PRV valve carried within the cavity and extending within the fluid passageway and comprising a head configured to define a seal between the cavity and the fluid passageway, and a shaft extending outwardly from the head within the fluid passageway,
  a first biasing member carried within the cavity to bias the PRV valve,
  a biasing member stop coupled to the PRV valve within the fluid passageway, and
  a second biasing member held within the fluid passageway by the biasing member stop and biasing the PRV valve; and
an end cap coupled to a last PRV stage of the plurality of PRV stages to hold the first biasing member within the cavity.

14. The PRV assembly of claim 13 wherein the biasing member stop is threadably coupled to the shaft.

15. The PRV assembly of claim 13 wherein the PRV valve comprises a sealing member carried by the head adjacent the fluid passageway.

16. The PRV assembly of claim 13 wherein the PRV body comprises a sealing member carried by a face of the enlarged size body section adjacent the reduced size body section to define a seal with an adjacent PRV body.

17. The PRV assembly of claim 13 wherein the fluid passageway has first and second shoulders therein; wherein the second biasing member rests on the first shoulder; and wherein a first biasing member of an adjacent PRV stage rests on the second shoulder.

18. A method of making a pressure relief valve (PRV) assembly comprising:
  coupling a plurality of PRV stages in end-to-end relation, each PRV stage comprising a PRV body having a cavity therein to receive an adjacent PRV body therein and a fluid passageway fluidly coupled to the cavity, a PRV valve carried within the cavity and extending within the fluid passageway, a first biasing member carried within the cavity to bias the PRV valve, a biasing member stop coupled to the PRV valve within the fluid passageway, and a second biasing member held within the fluid passageway by the biasing member stop and biasing the PRV valve; and coupling an end cap to a last PRV stage of the plurality of PRV stages to hold the first biasing member within the cavity.

19. The method of claim 18 wherein the PRV valve comprises a head configured to define a seal between the cavity and the fluid passageway, and a shaft extending outwardly from the head within the fluid passageway.

20. The method of claim 19 wherein the biasing member stop is threadably coupled to the shaft.

21. The method of claim 19 wherein the PRV valve comprises a sealing member carried by the head adjacent the fluid passageway.

22. The method of claim 18 wherein the PRV body has an enlarged size body section having the cavity therein and a reduced size body section; and wherein coupling the plurality of PRV stages comprises coupling the reduced size body within a cavity of an adjacent PRV body.

23. A method of making a pressure relief valve (PRV) assembly comprising:

forming each of a plurality of PRV stages by at least forming a PRV body having a cavity therein to receive an adjacent PRV body therein and a fluid passageway fluidly coupled to the cavity, positioning a PRV valve carried within the cavity and extending within the fluid passageway, positioning a first biasing member carried within the cavity to bias the PRV valve, coupling a biasing member stop to the PRV valve within the fluid passageway, and positioning a second biasing member within the fluid passageway and to be held by the biasing member stop to bias the PRV valve;

coupling the plurality of PRV stages in end-to-end relation; and coupling an end cap to a last PRV stage of the plurality of PRV stages to hold the first biasing member within the cavity.

24. The method of claim 23 wherein the PRV valve comprises a head configured to define a seal between the cavity and the fluid passageway, and a shaft extending outwardly from the head within the fluid passageway.

25. The method of claim 24 wherein coupling the biasing member stop comprises threadably coupling the biasing member stop to the shaft.

26. The method of claim 23 wherein the PRV body has an enlarged size body section having the cavity therein and a reduced size body section; and wherein coupling the plurality of PRV stages comprises coupling the reduced size body within a cavity of an adjacent PRV body.

* * * * *